United States Patent [19]

Takahashi et al.

[11] Patent Number: 4,923,208
[45] Date of Patent: May 8, 1990

[54] BABY CARRIAGE ALSO USABLE AS SHOPPING CARRIER

[75] Inventors: Takehiko Takahashi; Hitoshi Katou, both of Tokyo, Japan

[73] Assignee: Combi Co., Ltd., Tokyo, Japan

[21] Appl. No.: 175,426

[22] Filed: Mar. 30, 1988

[30] Foreign Application Priority Data

Mar. 31, 1987 [JP] Japan .............................. 62-46700[U]

[51] Int. Cl.$^5$ ........................ B62B 7/08; B62B 9/12; B62B 9/26
[52] U.S. Cl. ................................ 280/642; 280/47.35; 280/47.4; 297/192
[58] Field of Search ................ 280/33.996, 304.1, 642, 280/644, 47.35, 289 A, 289 WC, 47.4, 643, 647, 650, 658, 47.18, 48.38, 33.99 H; 297/189, 192, 193; 224/273, 42.42 R

[56] References Cited

U.S. PATENT DOCUMENTS

| | | | |
|---|---|---|---|
| 2,959,211 | 11/1960 | Buck | 297/192 |
| 3,026,141 | 3/1962 | Welles | 297/192 |
| 4,754,987 | 7/1988 | Williams | 280/289 WC |
| 4,763,919 | 8/1988 | Nakao et al. | 280/47.35 X |

FOREIGN PATENT DOCUMENTS 602396  5/1948  United Kingdom ................ 297/192

Primary Examiner—Charles A. Marmor
Assistant Examiner—Tamara L. Finlay
Attorney, Agent, or Firm—Sughrue, Mion, Zinn, Macpeak & Seas

[57] ABSTRACT

A baby carriage usable as a shopping carrier is disclosed which comprises a seat portion in which an infant may be seated, an article receiving body which has at an upper end a wide opening area and which is slidably mounted on a lower surface of the seat portion. The article receiving body is adapted to move from a position below the lower surface of the seat portion to a position at the rear of the lower surface of the seat portion when necessary.

8 Claims, 14 Drawing Sheets

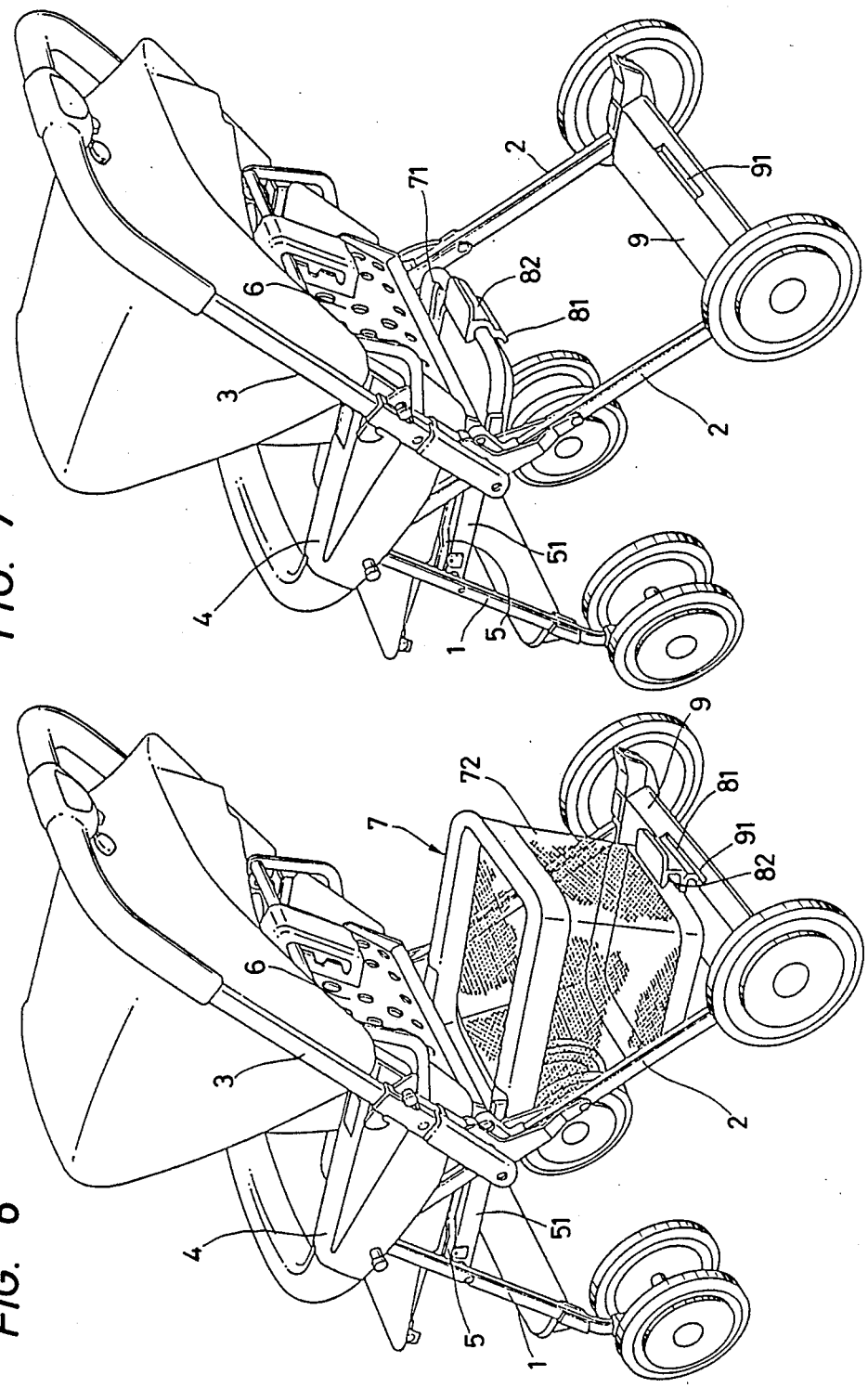

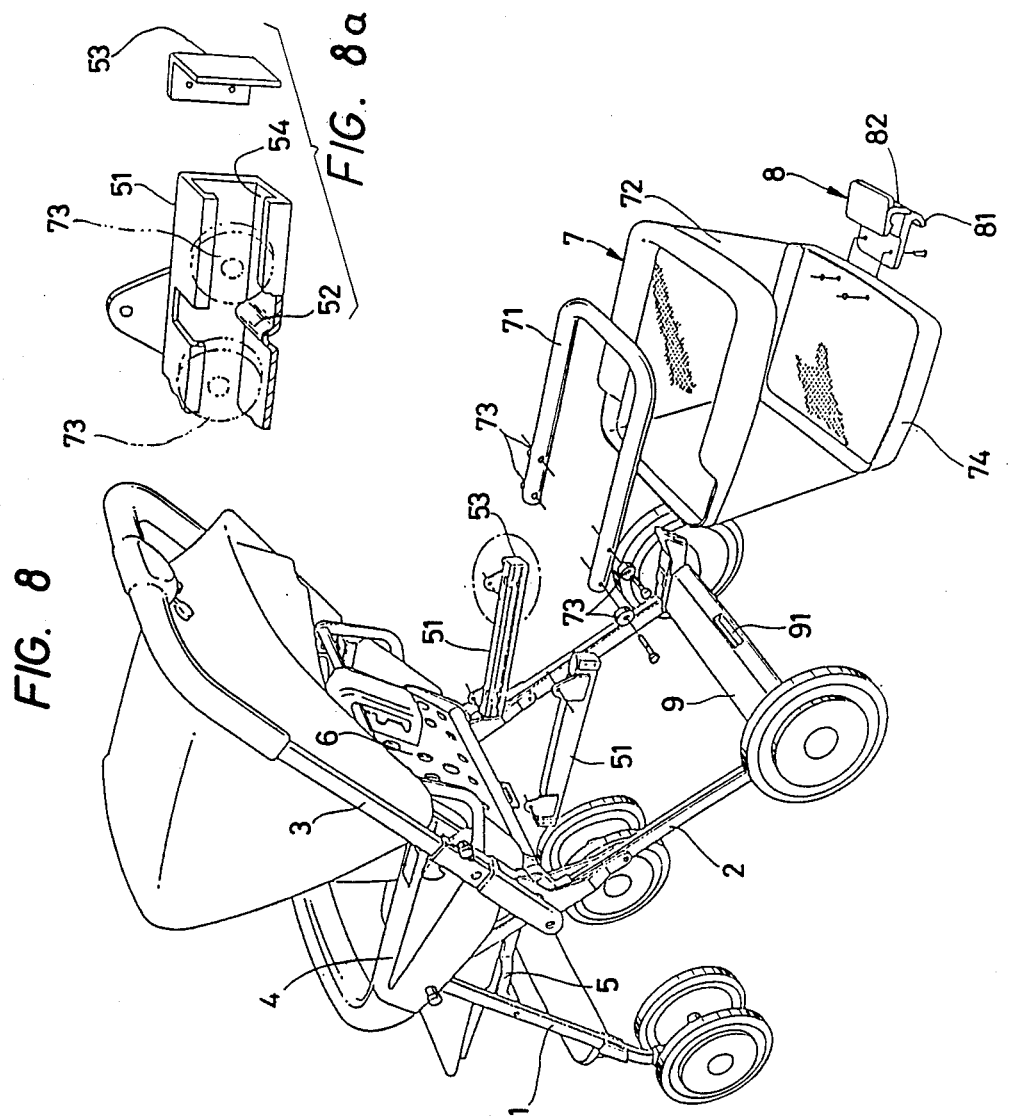

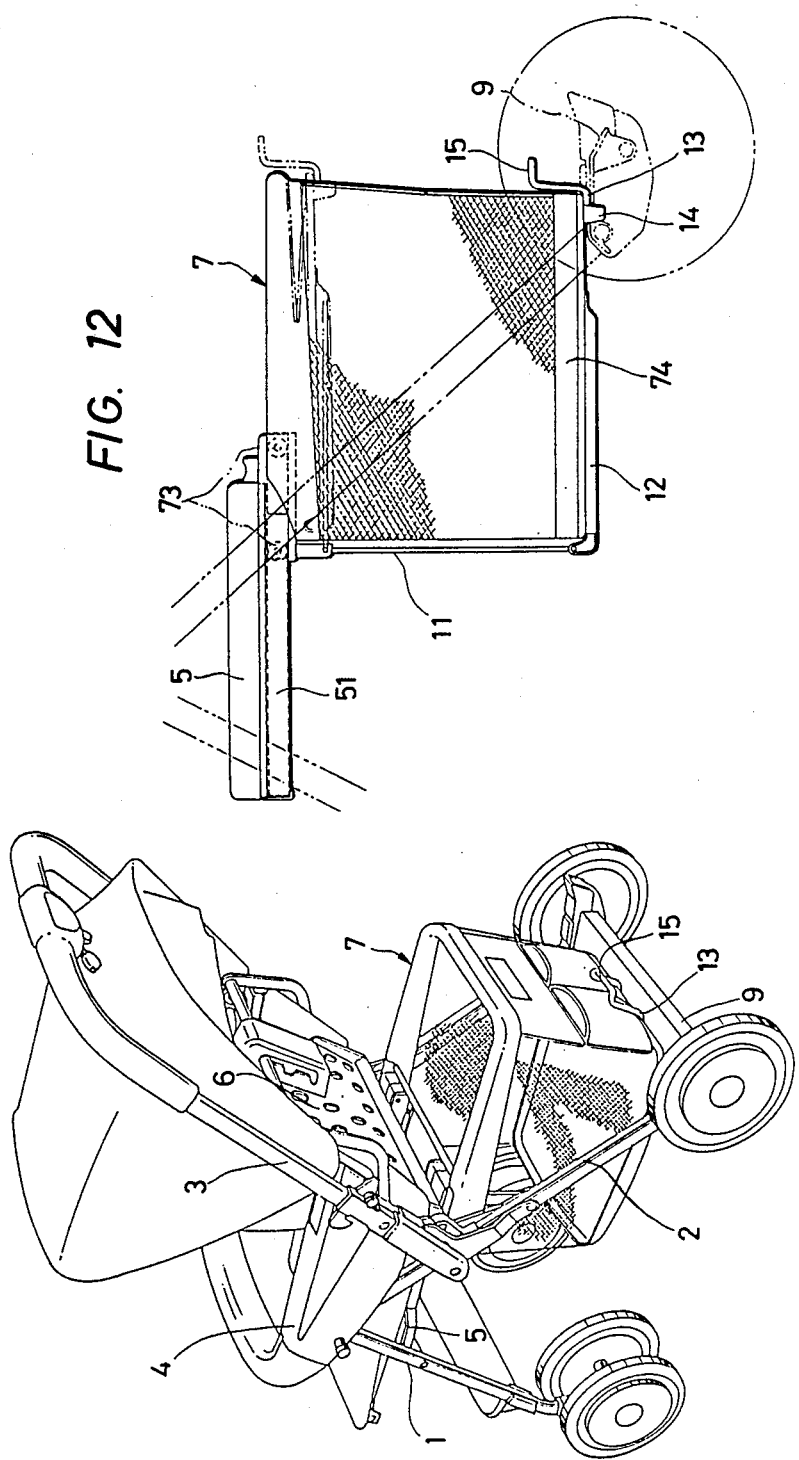

BABY CARRIAGE ALSO USABLE AS SHOPPING CARRIER

BACKGROUND OF THE INVENTION

The present device relates to a baby carriage which can be also used as a shopping carrier and in which a basket for receiving articles is mounted on the lower surface of a seat board in such a manner as to be slidable and foldable.

There have been known various constructions of baby carriages which are used to carry infants.

Some baby carriages are widely known to have full reclining mechanisms. Such a mechanism enables the relative angle between a seat portion on which an infant may be placed and a backrest portion to be freely changed from a condition in which the infant is seated to a condition in which it lies. Further, various carriage-pushing mechanisms for moving baby carriages have been known; they include a mechanism in which a pushing bar is located at the back of an infant so that the carriage can be pushed from the back thereof, and a mechanism in which a pushing handle is located in front of an infant so that the carriage can be pushed while the pusher faces the infant.

With known baby carriages, however, since the main function of baby carriages is to carry infants, there have been made no effective mechanisms for loading baby carriages with baggages and carrying them.

That is, although it has been known to provide a conventional baby carriage with a small article-receiving body, such as a basket, which is mounted on the lower surface of the seat board of the carriage, such a known article receiving body has to be mounted directly below the reverse surface of the seat board (i.e., within the projection area thereof). This is because of certain limitations concerning a mechanism for folding the baby carriage and of structural limitations concerning handling, etc. of the baby carriage.

If the construction of an article receiving body as described above is such that it is shaped like a relatively shallow plate, this would not cause much trouble. However, if the article receiving body is formed as a deep receptacle in order to increase the capacity thereof, a reduction is caused in space between the reverse surface of the seat board and the plane at the upper end of the article receiving body in which it opens. As a result, an operation of placing an article or articles in the body inevitably involved an operation of inserting the article(s) through the narrowly spaced gap formed between the seat board and the planed defined by the opening. This means that the entire opening area of article receiving body cannot be used effectively, which is disadvantageous.

In order to overcome this problem, a baby carriage also usable as a shopping carrier was devised and developed as disclosed in Japanese Utility Model Laid-Open No. 84805/1986 filed by the deviser of the present device. In this baby carriage, the plane in which the article receiving body opens is dislocated rearwardly from the lower surface of the seat board, thereby enabling a large opening area to be formed. However, this arrangement is nevertheless inconvenient. Because the article receiving body is fixed in place in such a manner as to be foldable in its fixed condition, the body inevitably forms a bulky structure on the back side of the backrest of the baby carriage when the body is folded.

The present device has been accomplished to cope with the circumstances described above, in view thereof. An object of the present device is to provide a baby carriage also usable as a shopping carrier which not only can serve as a baby carriage for carrying an infant but also can carry in infant while the baby carriage simultaneously receives and carries plenty of articles purchased during shopping.

Another object of the present invention is to provide a baby carriage also usable as a shopping carrier having an article receiving body which is mounted on the lower surface of a seat board and which is adapted in such a manner that, when the body is to be used, it is slided to and fixed at a position at the rear of a seat board, thereby enabling effective use of the entire opening area provided at the upper end of the article receiving body, while, when the body is not in use, it is moved and returned to a position below the lower surface of the seat board so as to be stowed, thereby enabling very compact folding and stowing of the baby carriage per se.

SUMMARY OF THE INVENTION

The gist of the device is that, in a known baby carriage, a baby carriage also usable as a shopping carrier comprises a seat board in which an infant may be seated, an article receiving body which has at the upper end a wide opening area and which is slidably mounted on the lower surface of the seat board, the article receiving body being adapted to move from below the lower surface of the seat board to the rear of the lower surface of the seat board when necessary.

BRIEF DESCRIPTION OF THE DRAWINGS

The drawings illustrate embodiments of the present device.

FIG. 6 is a perspective view showing a condition in which an article receiving body is pulled out in a second embodiment;

FIG. 7 is a perspective view showing a condition in which the article receiving body shown in FIG. 6 is stowed below the lower surface of a seat board;

FIG. 8 is a perspective view in which the article receiving body is shown in an exploded state;

FIG. 8a is an exploded view of the circled portion of FIG. 8.

FIG. 11 is a perspective view showing a condition in which an article receiving body is pulled out in a third embodiment;

FIG. 12 is a side elevational view of essential parts shown in FIG. 11;

DETAILED DESCRIPTION OF THE PREFERRED EMBODIMENTS

Figure 2:
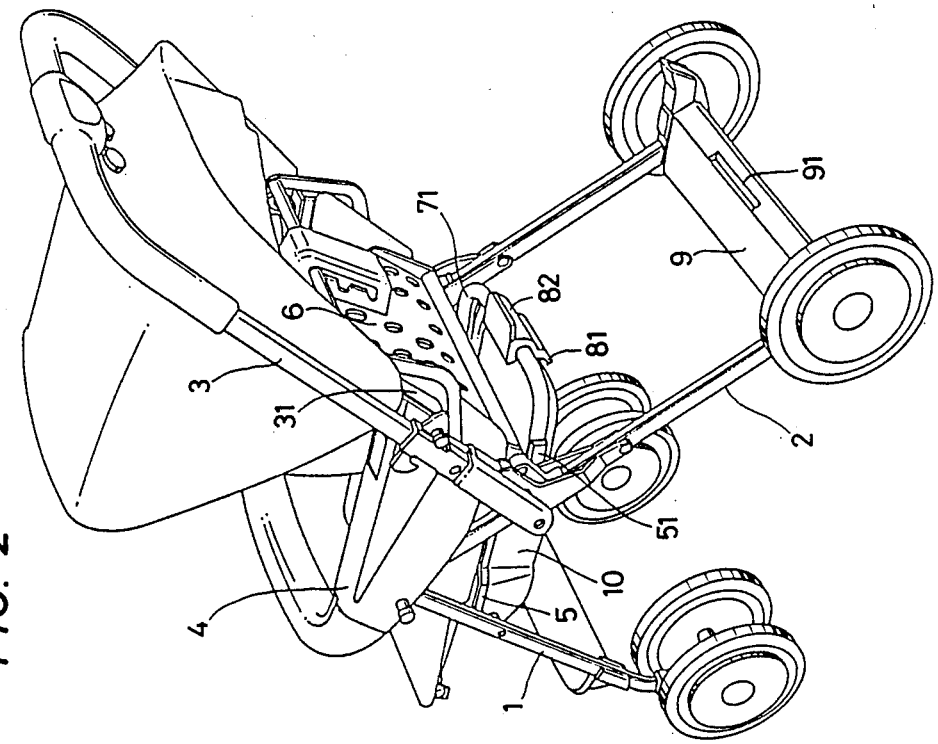
FIG. 2 is a perspective view showing a condition in which the article receiving body in FIG. 1 is stowed below the lower surface of a seat board.

Certain embodiments of the present device will be described hereunder with reference to the drawings.

First Embodiment

FIGS. 1 through 5 illustrate a first embodiment.

A baby carriage illustrated in the drawings has a known structure. Namely, a main body is constructed by foldably combining front legs 1, rear legs 2 and a pushing bar 3, and armrest members 4 are mounted in such a manner that they each extend between a pivot portion, at which the upper end portions of each front leg 1 and rear leg 2 are assembled, and a support bar 31 standing from the longitudinal intermediate portion of each rear leg 2.

Reference numeral 5 denotes a seat portion which is mounted in such a manner as to extend to each of the front legs 1, 1 and the rear legs 2, 2. A backrest portion 6 is pivotally mounted and stands in such a manner that it can be raised or flattened so as to allow the inclination angle to be freely adjusted.

Reference numeral 7 denoted an article receiving body. The body 7 is constructed as a deep, basket-shaped container by hanging a bag 72 formed with a net from a frame member 71 having a U-shaped planar configuration, thereby fixing the bag 72 to the frame member 71.

The frame member 71 is mounted in such a manner as to be slidable on guide rails 51, 51 that are mounted on both sides of the reverse surface of the seat portion 5.

A specific structure for mounting the frame member 71 is illustrated in detail in FIGS. 3 and 4, or FIGS. 8 and 9. Pulleys 73 ... 73 are rotatably mounted at end portions on both sides of the planarly U-shaped frame member 71, and the pulleys 73 are fitted in sliding grooves 54 formed in the guide rails 51, 51, thereby slidably mounting the frame member 71 in such a manner as to allow pulling-out and stowing of the frame member 71. With this arrangement, when the article receiving body 7 is in use, the body 7 is pulled out toward the rear end portions of the guide rails 51, 51, and the body 7 is supported and hung in such a manner as to be cantilevered in its pulled-out condition.

In a structure illustrated in FIGS. 8 and 8a, a pair of engagement projections 52, 52 are formed in the vicinity of the front and end portions of each of the guide rails 51, 51, and they each project by a small allowable height, so as to prevent unnecessary movement of the article receiving body 7. Preferably, the positions of the engagement projections at which they are disposed should be such that each projection will be positioned at an intermediate location between each pair of the pulleys 73, 73 which are mounted on the frame member 71 and spaced from each other in the back-and-forth direction. This arrangement makes the pulleys 73, 73 to move forward or backward with difficulty. When the frame member 71 is being moved, the pulleys 73, 73 are moved beyond the corresponding engagement projections 52, 52.

The mechanism for restricting the movement of the frame member 71 is not limited to the above-described engagement projections 52, and the mechanism may alternatively be any other structure so long as it enables the frame member 71 to be stopped at predetermined positions of the guide rails.

Reference numeral 53 denotes cover plates mounted on the end portions of the guide rails 51 for preventing disengagement of the pulleys 73 from the guide rails 51.

The bag 72, which is formed with a net, incorporates no special framework member for maintaining the deep, basket-shaped configuration of the bag. The developed configuration of the bag is maintained by the weight of a bottom board 74 mounted on the bottom surface (see FIG. 3).

Reference numeral 8 denotes a stopper mounted on a rear portion of the lower side of the bag 72. A flange-shaped engagement projection 81 is formed in such a manner as to project downward and is adapted to be able to fit in and engage with an engagement hole 91 formed in a step plate 9. The upper side of the stopper 8 has a handling portion 82 which is bent in such a manner as to have a U-shaped profile and which is adapted to be mounted on and engaged with a rear edge portion of the frame member 71.

Reference numeral 10 denotes a cover which is mounted on the reverse surface of the sat portion 5 and is formed in such a manner as to provide a U-shaped wall, thereby preventing the article receiving body 7 from being exposed to the outside when it is stowed below the lower surface of the seat portion 5. The cover 10 is fixed to the reverse surface of the seat portion 5 by being hung by means of bolts or the like passed through suitable upper positions of side plates standing on both sides of the cover.

Second Embodiment

A second embodiment is illustrated in detail in FIGS. 6 through 10.

The construction in accordance with this embodiment is exactly the same as that of the first embodiment except that, among the components illustrated in the previous embodiment, the cover 10 mounted on the lower surface of the seat portion 5 is omitted so that, when the article receiving body 7 is stowed below the lower surface of the seat portion, the body 7 remains exposed.

The elimination of the cover 10 adopted in this embodiment provides the effect of simplifying the operation of stowing the article receiving body 7. This embodiment is advantageous in that the operation of stowing the article receiving body 7 can be performed either in a manner illustrated in FIG. 24 (in which the article receiving body is moved to a position below the lower surface of the seat portion while it is kept in the same condition and, thereafter, the body is folded), or in a manner illustrated in FIG. 25 (in which the article receiving body is folded first and is then moved to a position below the lower surface of the seat portion).

Figure 13:
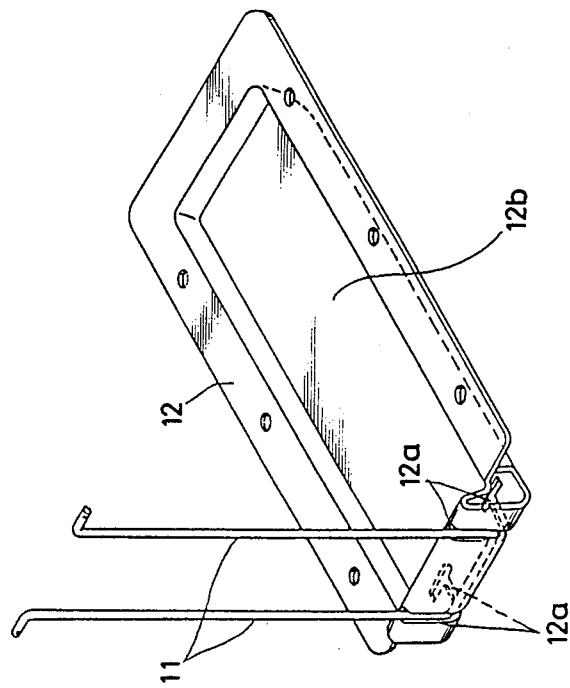
FIG. 13 is a perspective view showing the relationship between a hanging member and a shape-maintaining plate.
Figure 15:
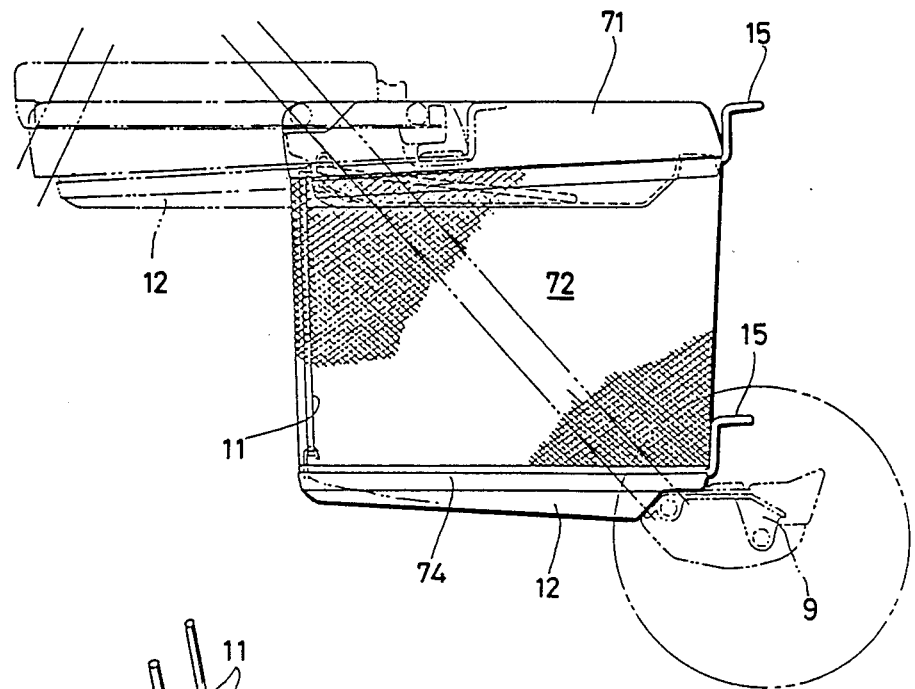
FIG. 15 is a side elevational view of essential parts shown in FIG. 14.
Figure 16:
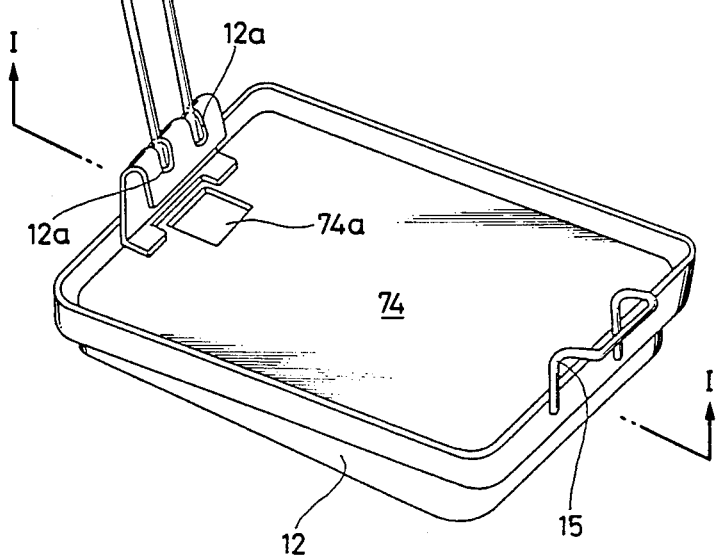
FIG. 16 is a perspective view showing the relationship between a hanging member and a shape-maintaining plate.
Figure 18:
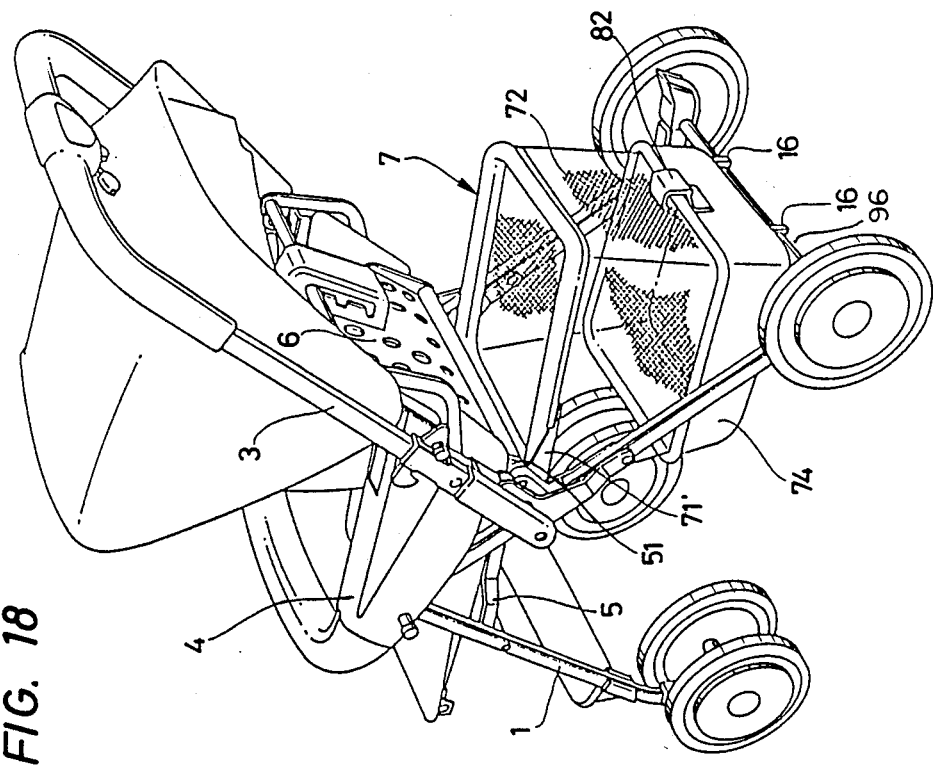
FIG. 18 is a perspective view showing the condition in which an article receiving body is pulled out in a fifth embodiment.
Figure 17:
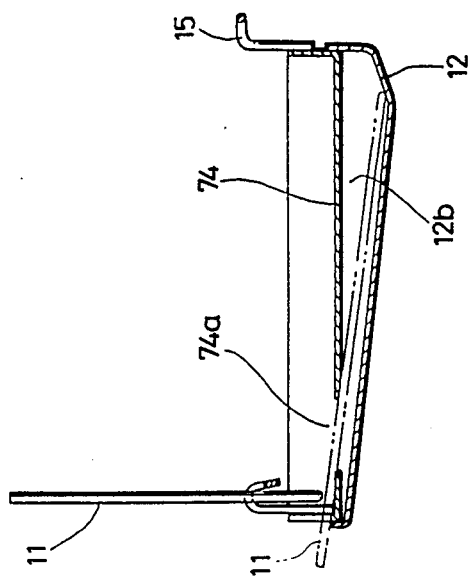
FIG. 17 is a sectional view taken along a line I—I shown in FIG. 16.
Figure 19:
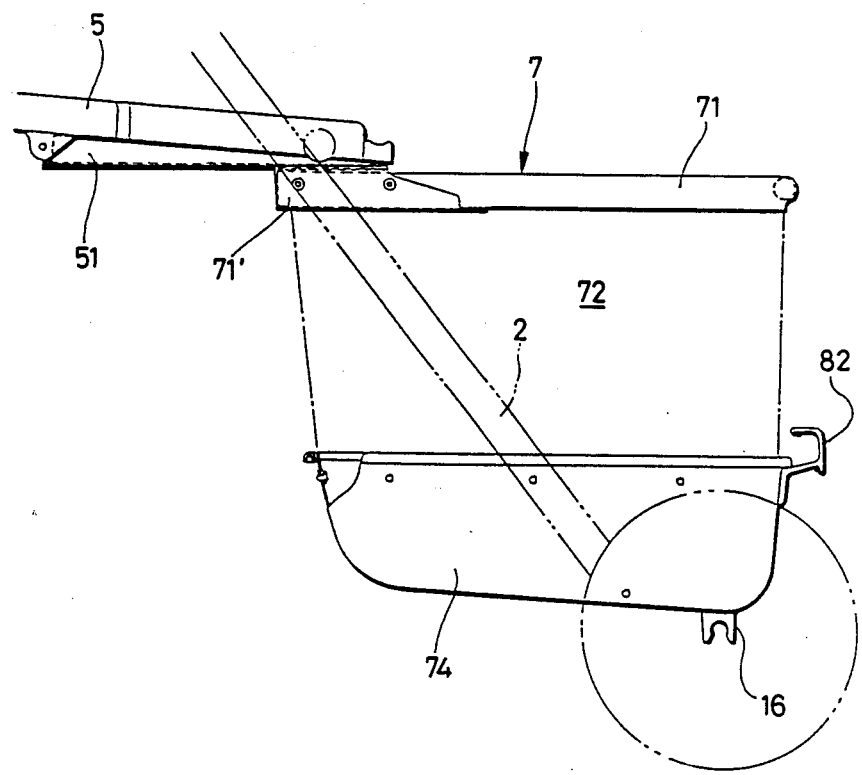
FIG. 19 is a side elevational view of essential parts shown in FIG. 18.
Figure 20:
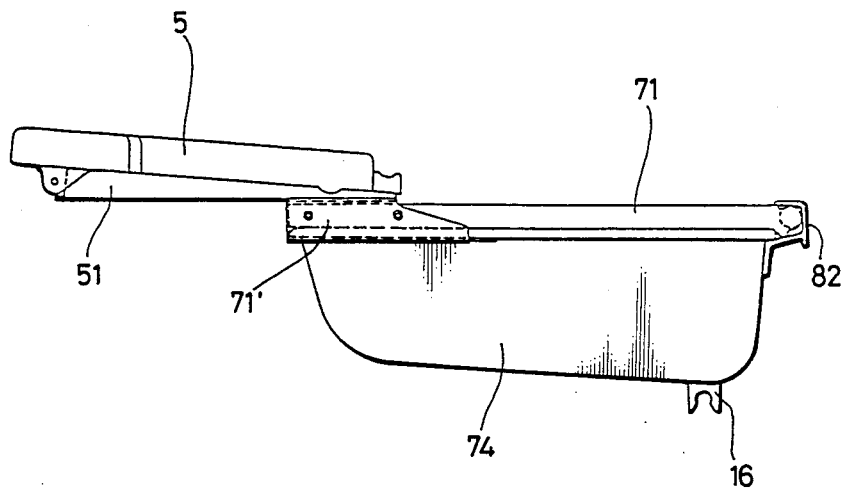
FIG. 20 is a side elevational view showing an example in which the article receiving body is folded while it is in the condition of being pulled out to the rear of a seat board.
Figure 21:
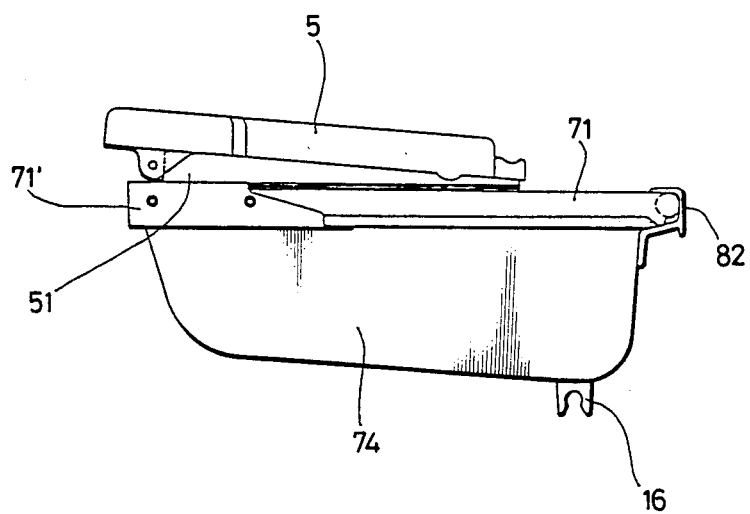
FIG. 21 is a side elevational view of essential parts which shows a condition the article receiving body illustrated in FIG. 17 is stowed below the lower surface of the seat board.

FIGS. 11 through 13 illustrate details of a third embodiment, in which is illustrated a modification of the basket-shaped article receiving body 7 illustrated in the first embodiment.

In this embodiment, the structures of the baby carriage proper are exactly the same as those of the first embodiment, and explanations concerning those structures according to this embodiment will be omitted.

The feature of this embodiment is that the article receiving body 7 is provided with a structure which makes the body to be able to maintain its folded condition.

This structural feature of the article receiving body 7 is as follows: a hanging member 11 is slidably mounted on the front surface of the article receiving body 7; a shape-maintaining plate 12, which defines a receptacle for the hanging member 11, is disposed and mounted on the bottom board 74 in such a manner as to form a body separate from the bottom board 74; and the arrangement of these members is such that the lower edge of the hanging member 11 is inserted in and engaged with an end portion of the shape-maintaining plate 12 in such a manner that the hanging member 11 can be stowed.

As illustrated in FIG. 13, the hanging member 11 is formed in such a manner as to have a substantially U-shaped or elongated angular U-shaped front elevational configuration, and the hanging member body is pivotally disposed and hung from the end portion of the frame member 71. The bent portions (transverse portion) on the lower edge of the elongated hanging member 11 are constructed such that they always fit in guide grooves 12a, 12a formed in the front end portion of the shape-maintaining plate 12. With this arrangement, in a folding operation, while the transverse portion and the longitudinal handing member body continuous therewith are kept in the same condition, they are slided into an d received in a hollow receptacle portion 12b, which is formed in the bottom surface of the shape-maintaining plate 12 so as to provide a double-bottomed configuration, starting from the leading side of the hanging member.

Reference numeral 13 denotes a stopper mounted on a rear portion of the lower edge of the bottom board 74. In the stopper 13, a downwardly projecting engagement plate 14 is constructed such that it can fit in the engagement hole 91 formed in the step plate 9.

Reference numeral 15 denotes a folding operation lever for folding the article receiving body 7. The lever 15 is formed at a lower rear portion of the article receiving body 7 in such a manner as to be integral with the engagement plate 14.

The folding operation lever 15 is adapted in such a manner that, if, during an operation of folding the article receiving body 7, this lever is held to lift the front end portion of the bottom board 74, the hanging member 11 is slided and guided into the hollow receptacle portion 12b, which are formed in the bottom surface of the shape-maintaining plate 12, easily and continuously starting from the lower edge portion of the hanging member 11.

Fourth Embodiment

FIGS. 14 through 17 illustrate a fourth embodiment of the present invention.

Since the structures of the baby carriage proper are also exactly the same as those of the first embodiment, explanations concerning those structures according to this embodiment will be omitted.

The fourth embodiment is exactly the same as the third embodiment, except that the position at which the hanging member 11 illustrated in the third embodiment is hung is so altered that the member 11 is hung from the front end portion of a bag 72, which forms an article receiving body 7, on the inner side thereof.

More specifically, the lower edge portion of a hanging member 11, which is formed in such a manner as to have a U-shaped or angular U-shaped front elevational configuration, is constructed such that it can be guided on the inner side of the bag 72 by guide groves 12a, 12a formed in the front end portion of a shape-maintaining plate 12 that is mounted on the reverse surface of a bottom board 74. In this guiding, the transverse portion of the hanging member 11, which connects the longitudinal ends of the member together, is guided into a hollow receptacle portion 12b, which is formed in the shape-maintaining plate 12e in such a manner as to provide a double bottomed configuration, after the leading portion of the hanging member body has been passed through an insertion guide hole 74a formed in a front end portion of the bottom board 74.

The remaining structures are the same as those of the third embodiment, and detailed explanations thereof will be omitted.

Fifth Embodiment

FIGS. 18 through 21 illustrate details of fifth embodiment.

Since the structures of the baby carriage proper are also exactly the same as those of the first embodiment, explanations concerning those structures according to this embodiment will be omitted.

The construction in accordance with the fifth embodiment is substantially the same as that of the first embodiment, except the following structures: a flange-shaped engagement projection 81 and a handling portion 82, which constitute a stopper 8, are provided in a separate manner in contrast with the first embodiment in which the corresponding members are integrated; guide rails 51 and a U-shaped frame member 71 are combined in a different manner; and a bottom board 74 has a relatively deep configuration.

More specifically, in the fifth embodiment, a pair of guide rails 51, 51 which each have an L-shaped cross-sectional configuration are mounted on the lower surface of the seat potion 5 in such a manner that their parallel plate portions are each face outward. (That is, their L-shaped upright portions are positioned back to back with each other while their transverse portions which each form the lower edge of the L-shape are directed outwardly.) Sliding plates 71' are provided on the front end portions of the U-shaped frame member 71, and they are mounted on the parallel plate portions of the guide rails 51, 51 in such a manner as to be held in place from the outside.

Further, in this embodiment, the bottom board 74, which is mounted at the lower end of a bag body 72 that constitutes an article receiving body 7, is formed into the shape of a deep plate with a hard material such as a synthetic resin. Stoppers 16 project downwardly from rear portions of the reverse surface of the deep plate-shaped bottom board 74 for engagement with a step bar 96.

Still further, a handle 82 having a U-shaped profile is provided on the rear surface of the bottom board 74 in such a manner as to be engageable with the frame member 71 during the folding.

The remaining structures are the same as those illustrated in first to fourth embodiments, and detailed descriptions thereof will be omitted.

Sixth Embodiment

Figure 23:
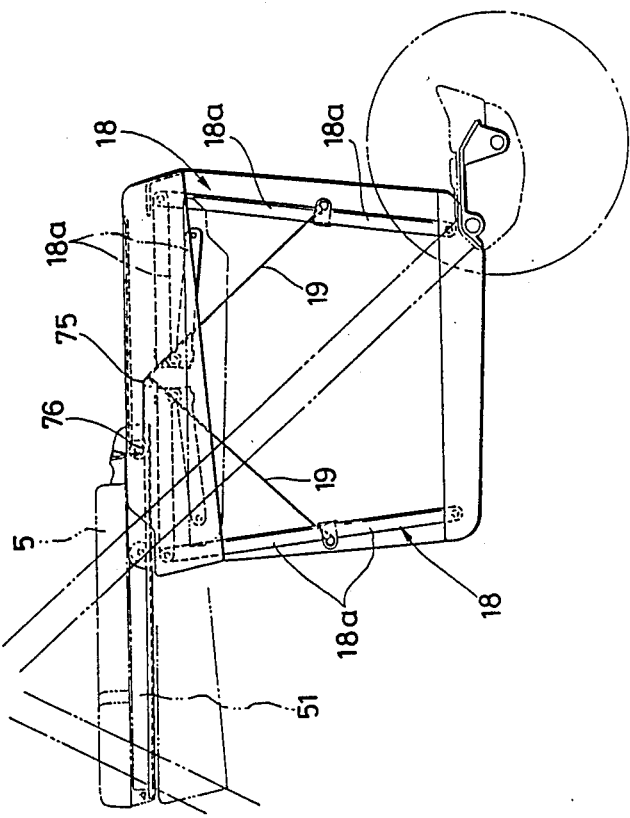
FIG. 23 is an enlarged side elevational view of essential parts shown in FIG. 22.
Figure 22:
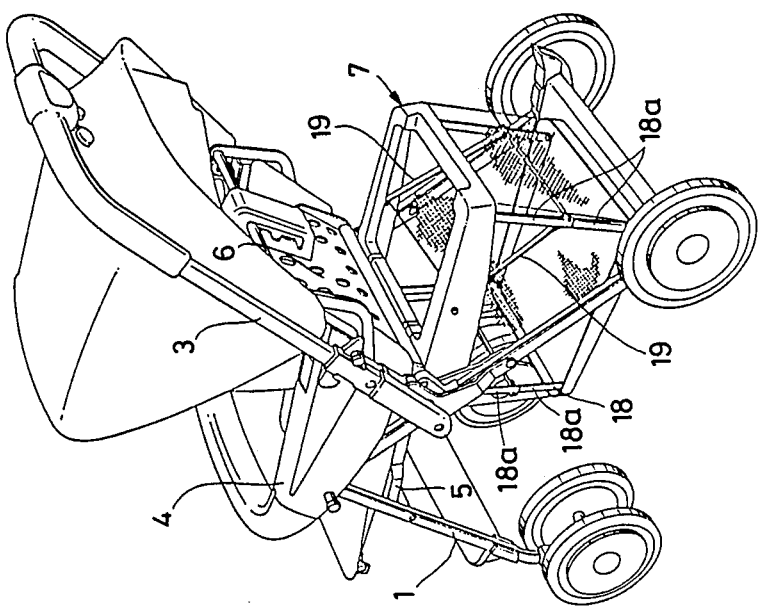
FIG. 22 is a perspective view showing a condition in which an article receiving body is pulled out to the rear of a seat board in a sixth embodiment.

FIGS. 22 and 23 illustrate details of a sixth embodiment.

Since the structures of the baby carriage proper are also exactly the same as those of the first embodiment, explanations concerning those structures according to this embodiment will be omitted.

The sixth embodiment illustrates a structure in which the article receiving body 7 can be automatically folded by causing the body 7 to slide to a position below the lower surface of the seat portion 5.

Reference numerals 18 denote shape-maintaining frame members disposed between a frame member 71 and a bottom board 74, which constitute an article receiving body 7, in such a manner as to extend therebetween. Each of the shape-maintaining frame members is composed by linking a pair of links 18a, 18a in such a manner that they can be folded inwardly at a pivot.

The shape-maintaining frame members 18 ... 18 are mounted at all four inner corners of the article receiving body 7, respectively.

Reference numerals 19, 19 denote strings provided for the operation of folding the shape-maintaining frame members 18. Each of the strings 19 has one end thereof connected to the pivot portion of the corresponding pair of links 18a, 18a. The other end of each string 19 is fixed to the rear end portion of the corresponding guide rail 51 after the string has been passed successively through two points at which are supported, respectively, a guide pin 75 mounted at a central location of the inner side of the U-shaped frame member 71 and another guide pin 76 mounted at a position closer to the front end portion of the U-shaped frame member 71 on the inner side thereof.

The dimensions of the string 19 provided for the folding operation are determined such that, when the article receiving body 7 is being pulled out and slided rearwardly from below the lower surface of the seat portion, the shape-maintaining frame members 18 are brought into their straight conditions. The strings 19 are adapted to be stowed at positions parallel to the U-shaped frame member 71 when the article receiving body 7 is stowed below the lower surface of the seat portion 5.

The baby carriage in accordance with the present device which is constructed as described above is used in the following manner.

In the embodiments, there are three methods of developing the article receiving body when it is necessary to use the body.

Figure 24A:
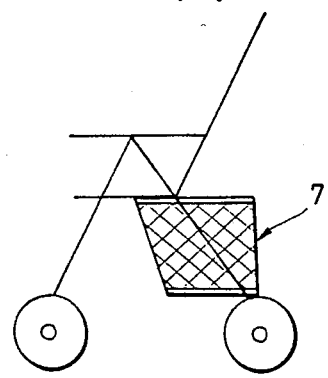
FIG. 24 is a schematic view showing the operation in which the article receiving body is folded or developed below the lower surface of the seat portion.
Figure 25A:
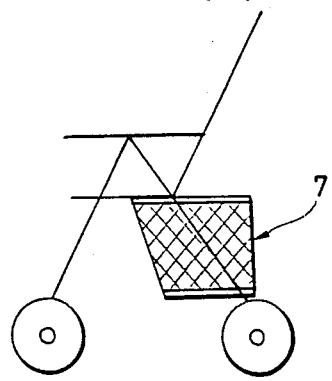
FIG. 25 is a schematic view showing the operation in which the article receiving body is folded or developed at a position at the rear of the seat portion.
Figure 26A:
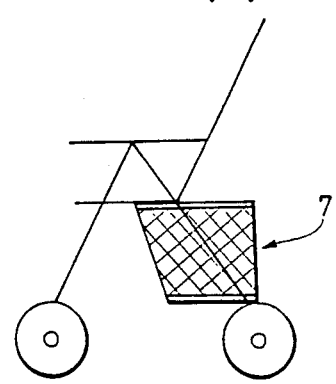
FIG. 26 is a schematic view showing the operation in which the article receiving body is folded or developed while it is being moved.
Figure 24B:
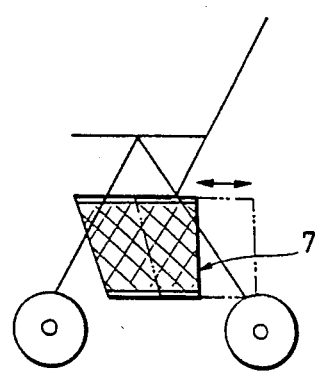
Figure 25B:
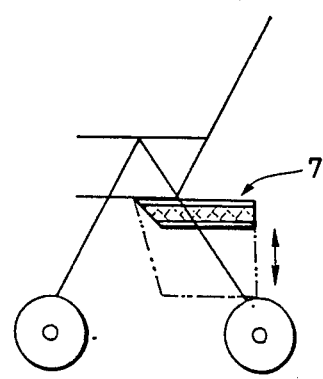
Figure 26B:
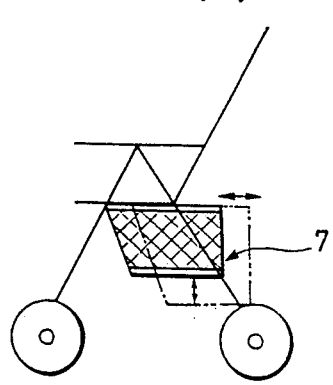
Figure 24C:
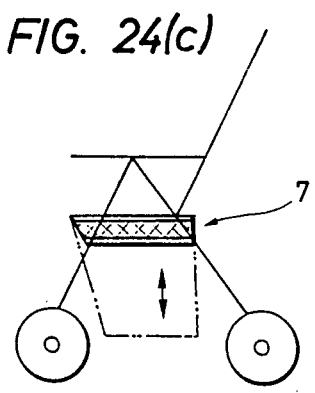
Figure 25C:
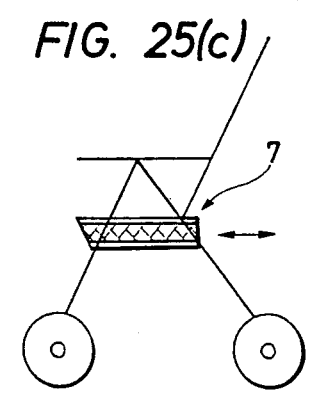
Figure 26C:
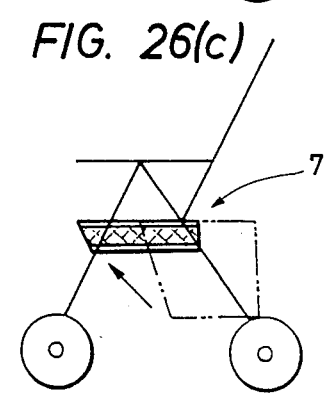

(1) A first method comprises, as schematically illustrated in FIG. 24, developing the article receiving body 7 at a position below the lower surface of the seat portion and, thereafter, pulling out the thus developed article receiving body 7 to the rear of the seat portion, thereby allowing use of the body. (2) A second method comprises, as schematically illustrated in FIG. 25, pulling out the article receiving body 7 from below the lower surface of the seat portion 5 to the back (rear) of the seat portion while the body 7 is kept in the folded condition and, thereafter, developing the body 7 at the position at the back of the seat portion 5. (3) Lastly, a third method comprises, as schematically illustrated in FIG. 26, pulling out the article receiving body 7 folded and stowed below the lower surface of the seat portion 5 to the rear of the seat portion 5, whereby both the exposed part of the opening area of the article receiving body 7 and the height of the same are automatically and gradually enlarged and increased, so that, when the frame member 71 has been pulled out to the rearmost stop position, the fully developed condition of the article receiving body 7 is completed.

Among the above-described methods (1) to (3), the second method (2) is a developing method applicable to a case where a cover 10 is provided on the lower surface of the seat portion 5, as in the first embodiment. Either the first (1) or second (2) method can be selectively and arbitrarily applied to any of the second through fifth embodiments. The third (3) method is applicable to the sixth embodiment.

(1) When It Is Necessary to Use Article Receiving Body (Case 1) With the First Embodiment This developing method corresponds to the method (2) described above, i.e., that illustrated in FIG. 25.

Figure 5:
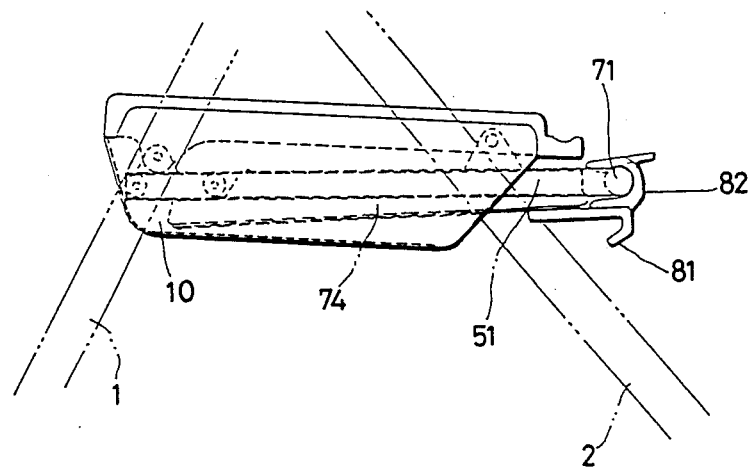
FIG. 5 is a side elevational view of essential parts with the condition shown in FIG. 2.
Figure 9:
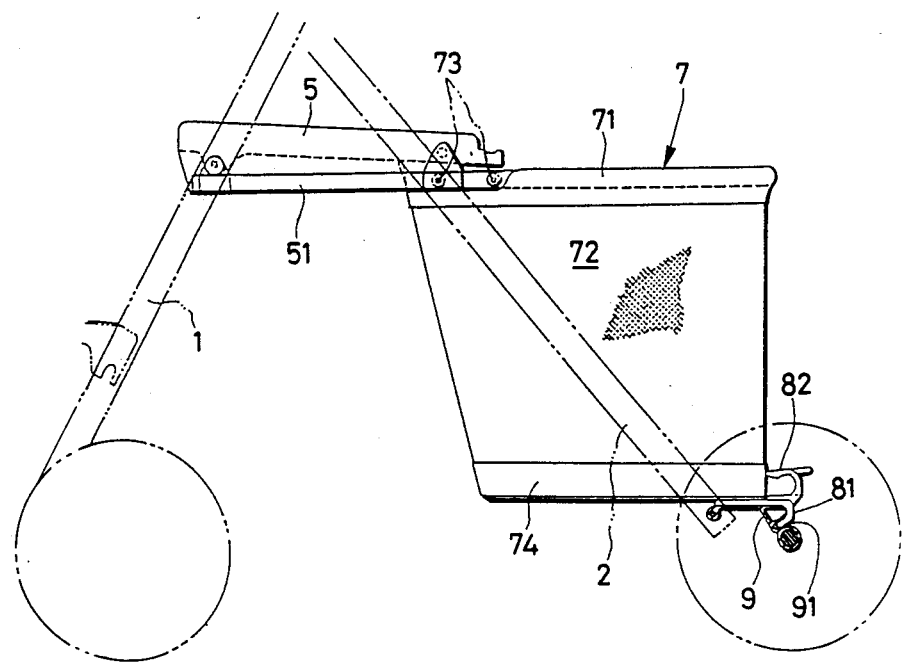
FIG. 9 is a side elevational view showing the condition of engagement between the article receiving body and a step.
Figure 10:
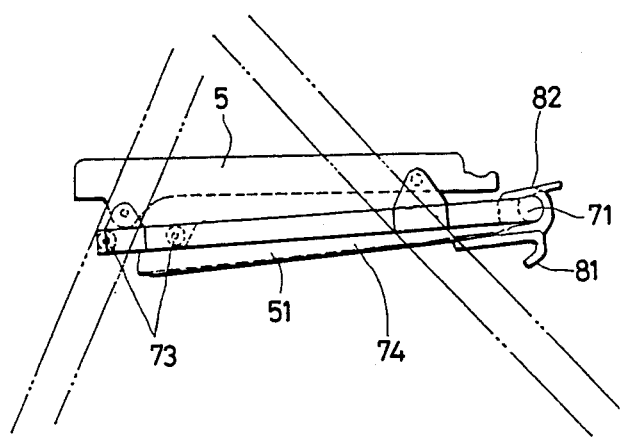
FIG. 10 is a side elevational view of essential parts with the condition shown in FIG. 7.
Figure 14:
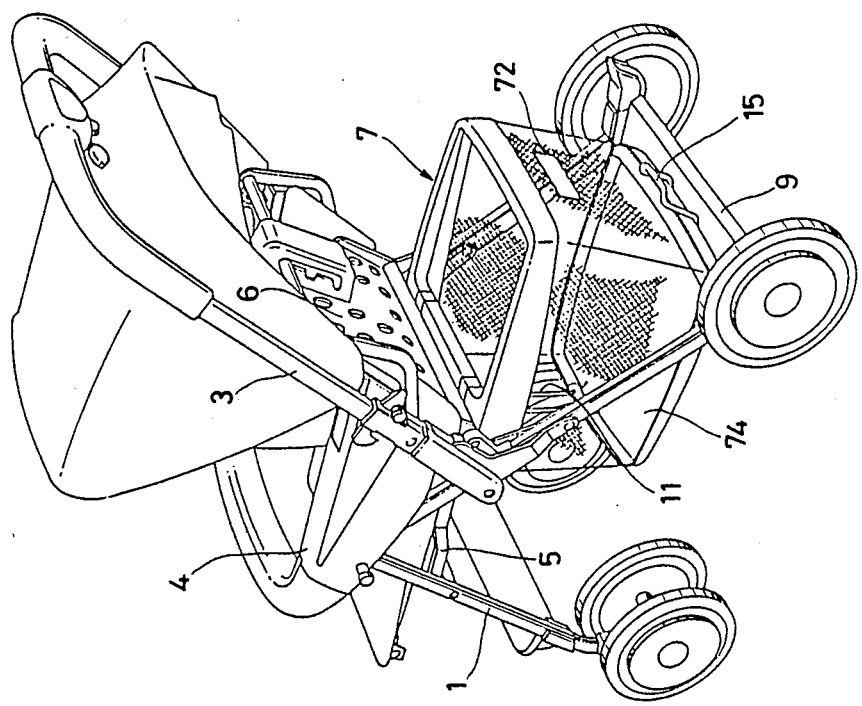
FIG. 14 is a perspective view showing a condition in which an article receiving body is pulled out in a fourth embodiment.

When it is necessary to use the article receiving body with this embodiment, the article receiving body 7 folded and stowed below the lower surface of the seat portion, as illustrated in FIGS. 2 and 5, is first pulled out rearward while the body 7 is kept in its folded condition. Subsequently, the engagement between the front end portion of the bottom board 74 and the front end portions of the guide rails 51, 51 is released and, thereafter, the handle portion 82 is released from its engagement with the rear portion of the U-shaped frame member 71, thereby releasing the article receiving body 7 from its folded condition.

When the article body 7 has been pulled out to the rear of the seat portion 4 and developed into a predetermined shape by virtue of the weight of the bottom board 74, the body 7 can be brought into a stable suspended condition in which it is prevented from moving unnecessary, by bringing the flange-shaped engagement projection 81 of the stopper 8, which is formed at the rear portion of the lower surface of the bottom board 74, into engagement with the engagement hole 91 formed in the step plate 9. With this condition, the body 7 can be used for receiving articles purchased.

In addition, any unnecessary movement of the article receiving body 7 is prevented by the engagement projection 52, 52 which are formed in the vicinity of the front and rear end portions of the guide rails 51 and which act to restrict the movement of the pulleys 73, 73.

(2) Use of Article Receiving Body (Case 2) With Any of Second through Fifth Embodiments i. If Method Illustrated in FIG. 24 Is Used This development method corresponds to the method (1) described above, and it can be used with any of the constructions according to the second through fifth embodiments.

In this case, operations should be carried out in the order of (c)→(b)→(a) shown in FIG. 24. That is, the article receiving body 7, folded and stowed below the lower surface of the seat portion, as illustrated, for instance by two-dot-chain lines in FIG. 5 (i.e., in the condition (c) shown in FIG. 24), is released from the folded condition and developed at the same position, so as to be brought into its suspended condition (i.e., into the condition (b) shown in FIG. 24). Subsequently, the body 7 is pulled to the back (rear) of the seat portion 5, thereby completing the operations (upon achievement of the condition (a) shown in FIG. 24).

The following gives explanations of this method as it is applied to a specific embodiment, for instance, the third embodiment (FIGS. 11 to 13).

When the folding operation level 15 projecting from the rear portion of the bottom board 74 of the article receiving body in the condition of being folded and stowed below the lower surface of the seat portion 5 is lifted and simultaneously moved rearward, the hanging member 11 which has been received within the hollow receptacle portion of the shape-maintaining plate 12 becomes exposed continuously starting from its base portion. While the exposure of the hanging member 11 proceeds, the bag portion 72, which has been folded, becomes gradually developed, until the entire length of the hanging member 11 is exposed, thereby releasing the article receiving body 7 from its folded condition.

The arrangement of the hanging member 11 is such that, when the entire length of the hanging member 11, which has been stowed, becomes exposed, its tip portion is brought into engagement with the bottom board 74. By virtue of this arrangement, the hanging member 11 supports, at this time, the front end portion of the bottom board 74 of the article receiving body 7 so that this portion is hung from the member 11 (FIG. 24 (b) shows this condition.)

When the article receiving body 7 has been brought into the condition described above, the body 7 is moved to the back (rear) of the seat portion 5. Thereafter, the engagement plate 14, which is integral with the stopper 13 at the rear portion of the lower surface of the bottom board 74, is brought into engagement with the engagement hole 91 formed in the step plate 9. In this way, it is made possible to attain a stable suspension in which the article receiving body 7 is prevented from moving unnecessarily. The body 7 is used in this condition for receiving articles purchased.

ii. If Method Illustrated in FIG. 25 Is Used

This developing method corresponds to the method (2) described above. This method should necessarily be adopted in the first embodiment. If the construction is that of any of the second through fifth embodiments, this method can be used when necessary if desired, similarly to the method described in the previous section.

This method carries out the development in the reverse of the order followed by the developing method illustrated in FIG. 24, in which the article receiving body 7 is pulled out to the rear of the seat portion 5 while it is kept in its folded condition and the body is then developed. The operations of the method illustrated are carried out in the order of FIG. 25 (c)→(b)→(a).

The following gives explanations of this method as it is applied to a specific embodiment, for instance, the third embodiment (FIG. 11 to 13).

First, the article receiving body 7 in the condition of being folded and stowed below the lower surface of the seat portion 5 is pulled out to the rear of the seat portion 5 while the body 7 is kept in the same condition (At this time, the article receiving body 7 is still in the folded condition, as shown in FIG. 25 (b)). Subsequently, when the folding operation lever 15, which is provided at the rear portion of the bottom board 74 in a projecting manner, is held to move the front end portion of the board 74 downward, the hanging member 11, which has been received in the hollow receptacle portion 12b of the shape-maintaining plate 12, becomes exposed continuously starting from its base portion. While the exposure of the hanging member 11 proceeds, the bag potion 72, which has been folded, becomes gradually developed, and, when the entire length of the hanging member 1 becomes exposed, the folded condition of the article receiving body 7 is released.

The arrangement of the hanging member 11 is such that, when the entire length of the hanging member 11, which has been stowed, becomes exposed, its tip portion is brought into engagement with the bottom board 74. By virtue of this arrangement, the hanging member 11 supports, at this time, the front end portion of the bottom board 74 of the article receiving body 7 so that this portion is hung from the member 11 (FIG. 25 (a) shows this condition.)

When the article receiving body 7 has been brought into the condition described above, the engagement plate 14, which is integral with the stopper 13 at the rear portion of the lower surface of the bottom board 74, is brought into engagement with the engagement hole 91 formed in the step plate 9. In this way, it is made possible to attain a stable suspension in which the article receiving body 7 is prevented from moving unnecessarily. The body 7 used in this condition for receiving articles purchased.

(3) Use of Article Receiving Body (Case 3)

This development method corresponds to the method (3) described above, and is applicable to the sixth embodiment.

In this case, the development operation starts with pulling out of the article receiving body 7 positioned below the lower surface of the seat portion 5, as illustrated in FIG. 26 (c), to the rear to the seat portion 5.

With the condition illustrated in FIG. 26 (c), all the shape-maintaining frame members 18 are each folded inwardly at the pivot portions by the contracting action of the operation strings 19, 19 in such a manner that the links 18a, 18a constituting each frame member 18 are superimposed on each other, as illustrated by two-dot-chain lines in FIG. 23. Thus, the entire article receiving body 7 is folded into a thin compact structure.

When the article receiving body 7 in the above-described condition is being pulled out to the rear of the seat portion 5, while the pulling-out proceeds, the exposed part of the opening area defined by the frame member 71 gradually increases, and, simultaneously with this increase, the volume of the article receiving body 7 also gradually increases in height. That is, at the point where the amount through which the article receiving body 7 has been pulled out corresponds to one half of the entire moving amount (i.e, with the condition illustrated in FIG. 26 (b)), approximately one half of the opening area defined by the upper surface of the frame member 71 is opened, and, simultaneously, the extension in the direction of height corresponds to approximately one half of the entire extension. When the article receiving body 7 has completed its movement (its being pulled-out) through the entire amount, the development of the article receiving body 7 is also completed entirely, as illustrated in FIG. 26 (a). In this method, all these operations are performed automatically by extension of the operation strings 19 which is caused by the downward movement of the bottom board 74 under its own weight, and by extending action of each pair of links 18a, 18a which is caused by the extension of the strings.

(4) Stowage of Article Receiving Body (Case 1) With the First Embodiment

*If Method Illustrated in FIG. 24 Is Used for Stowage

In this stowage, the releasing operations described before concerning "Use of Article Receiving Body (Case 2i)" are performed reversely.

More specifically, the article receiving body 7 is moved from its position at the rear of the seat portion (illustrated in FIG. 24(a)) to a position below the lower surface of the seat portion 5, while the body is kept in the developed condition (see FIG. 24(b)). Subsequently, the bottom board 74 portion of the article receiving body 7 is lifted to move the bottom board 74 portion close to the U-shaped frame member 71 portion until they are substantially superimposed, and, when this condition has been achieved, the front end portion of the bottom board 74 and the corresponding front end portions of the guide rails 51 are brought into engagement by suitable means.

Subsequently, the handle portion 82 of the stopper 8 mounted on the rear portion of the bottom board 74 is brought into engagement with the U-shaped frame member 71, thereby achieving a complete folding.

(5) Stowage of Article Receiving Body (Case 2)

*If Method Illustrated in FIG. 25 Is Used

In this stowage, the releasing operations described before concerning "Use of Article Receiving Body (Case 1 and Case 2ii)" are performed reversely, this being similar to the stowage described above.

That is, the folding is performed by moving the bottom board 74 of the article receiving body 7 toward and close to the frame member 71, while the body 7 is kept at a position to the back (rear) of the seat portion 5, as illustrated in FIG. 25 (a) (see FIG. 25 (b)). When the article receiving body 7 has thus been folded, it is advanced along the guide rails 51 so that it can be positioned below the lower surface of the seat portion 5, as illustrated in FIG. 25 (c).

The specific method of folding the article receiving body 7 is the same as that in either of the stowage methods (Case 1 and Case 2) stated above. Just to make sure, however, detailed explanations will be given below, by way of example of the third embodiment (FIGS. 11 to 13).

The bottom board 74 of the released article receiving body 7 and the folding operation lever 15 mounted on the board 74 are lifted in such a manner that the bottom board 74 is inclined and the front end portion of the board 74 is directed upward.

By this operation, the lower end portion of the hanging member 11 is inserted into and stowed in the shape-maintaining plate 12, mounted on the lower surface of the bottom board 74, continuously starting from the lower end portion of the hanging member 11, and, finally, the front end portion of the shape-maintaining plate 12 is lifted to a position adjacent to the mounting base portion of the hanging member 11. While the insertion of the hanging member 11 into the shape-maintaining plate 12 proceeds, the leading end portion of the hanging member 11 acts to lift the rear end portion of the shape-maintaining plate 12. Therefore, when the front end portion of the bottom board 74 and the hanging base portion of the hanging member 11 have been brought close to and into contact with each other, the entire bottom board 74 is in close contact with the U-shaped frame member 71, thereby completing the stowage.

(6) Stowage of Article Receiving Body (Case 3)

*If Method Illustrated in FIG. 26 Is Used

In this stowage, the operations described before concerning "Use of Article Receiving Body (Case 3)" are performed reversely, this also being similar to the stowage described above.

That is, in this stowage, the U-shaped frame member 71 is simply pushed toward the lower surface of the seat portion 5 from the position of the article receiving body 7 at the rear of the lower surface of the seat portion 5.

When the U-shaped frame member 71 is being pushed, the respective positions of the guide pins 75 and 76, which are mounted on the frame member, naturally advance. When the positions of the guide pins advance, the strings 19, which have their base end portion fixed to the corresponding rear end portions of the guide rails 51, are brought into contact with the guide pins 75 at positions which gradually advance forward. During this action, these strings 19 are pulled upward in such a direction that the inverted-V-shaped configuration viewed in FIG. 22 which the strings 19 have maintained shrinks. As the pulling-up of the strings 19 proceeds (i.e., as the pushing of the u-shaped frame member 71 proceeds), each of the shape-maintaining frame member 18 ... 18 becomes folded inwardly at the pivot portion, at which the pair of links 18a, 18a are joined, in such a manner that these links become superimposed. Finally, the bottom board 74 portion is brought into close contact with the U-shaped frame member 71, and, the stowage is completed upon achievement of this condition.

The above-described stowage operation can be performed easily by the simple operation of pushing the U-shaped frame member 71.

(Effects of the Device)

The features of the constructions of the present device are given below.

(1) The article receiving body 7, which has conventionally been fixed at a position immediately below the seat portion, is adapted to be able to be pulled out and moved from a position immediately below the lower surface of the seat portion 5 to a position at the rear of the lower surface. Therefore, it is possible to construct the article receiving body in such a manner that the body is large sized so that the upper end of the body is almost adjacent to the lower surface of the seat portion 5.

In other words, even if the article receiving body 7 is large sized, since, during use of the body 7, it is slided and moved to a position at the rear of the lower surface of the seat portion 5, the entire opening area can be effectively used as the inlet port for articles. This enables a complete solution of the problem of a conventional large-sized basket that is caused by a narrow space between the opening portion and the lower surface of the seat portion, with regard to the operation of stowing articles.

Figure 1:
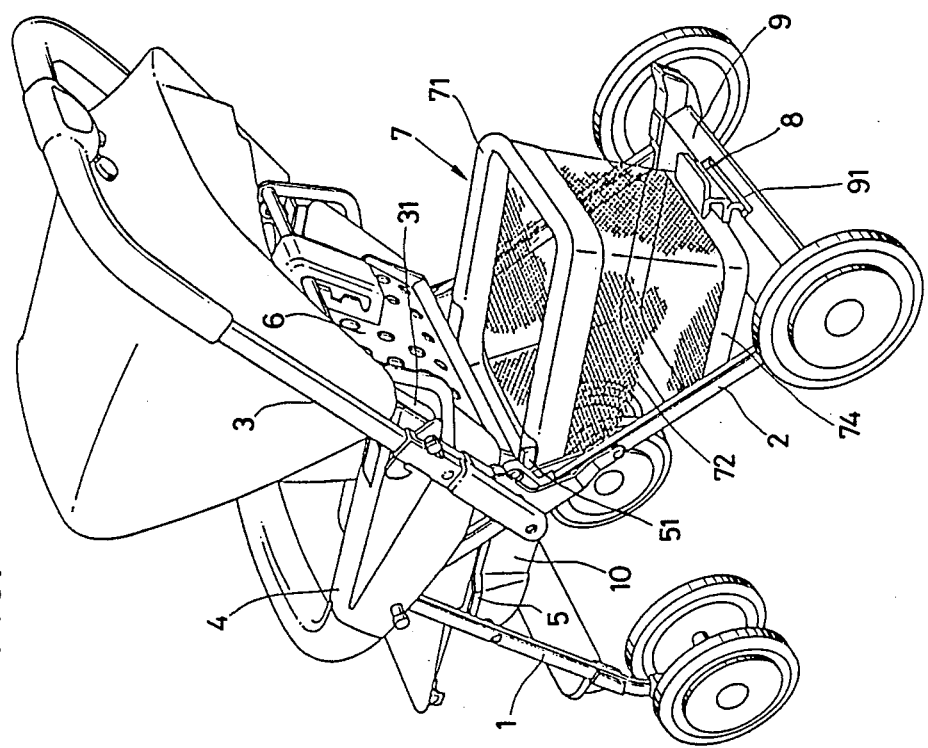
FIG. 1 is a perspective view showing a condition in which an article receiving body is pulled out in a first embodiment.
Figure 3:
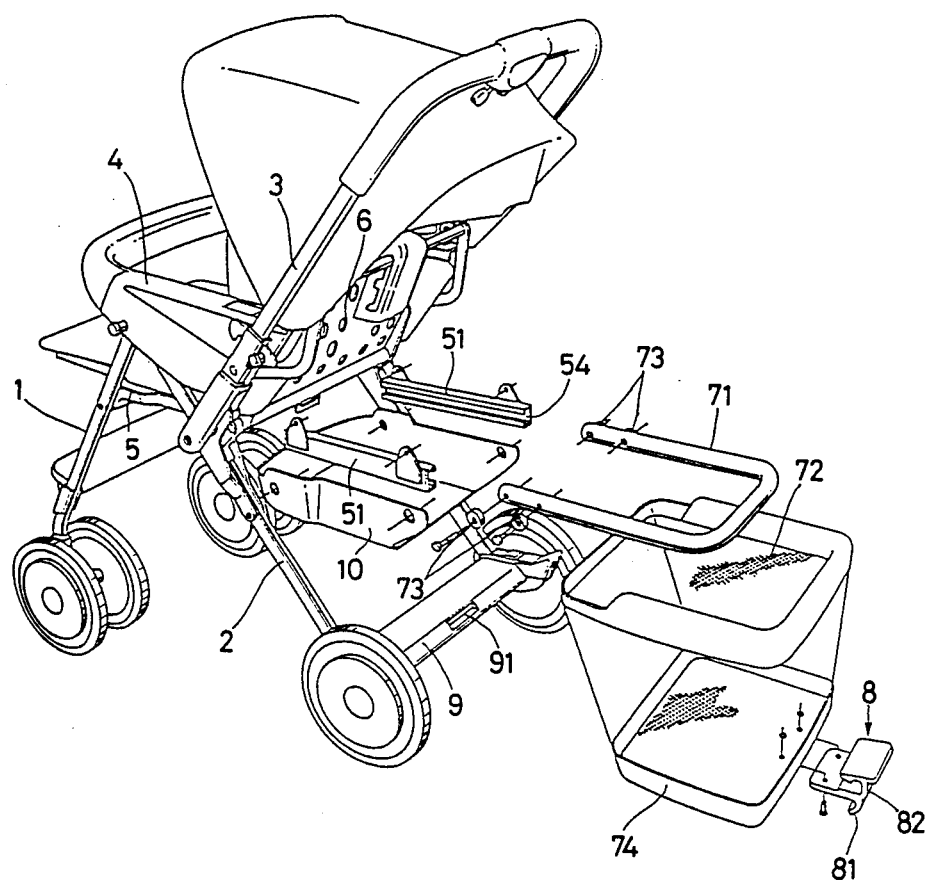
FIG. 3 is a perspective view in which the article receiving body is shown in an exploded state.
Figure 4:
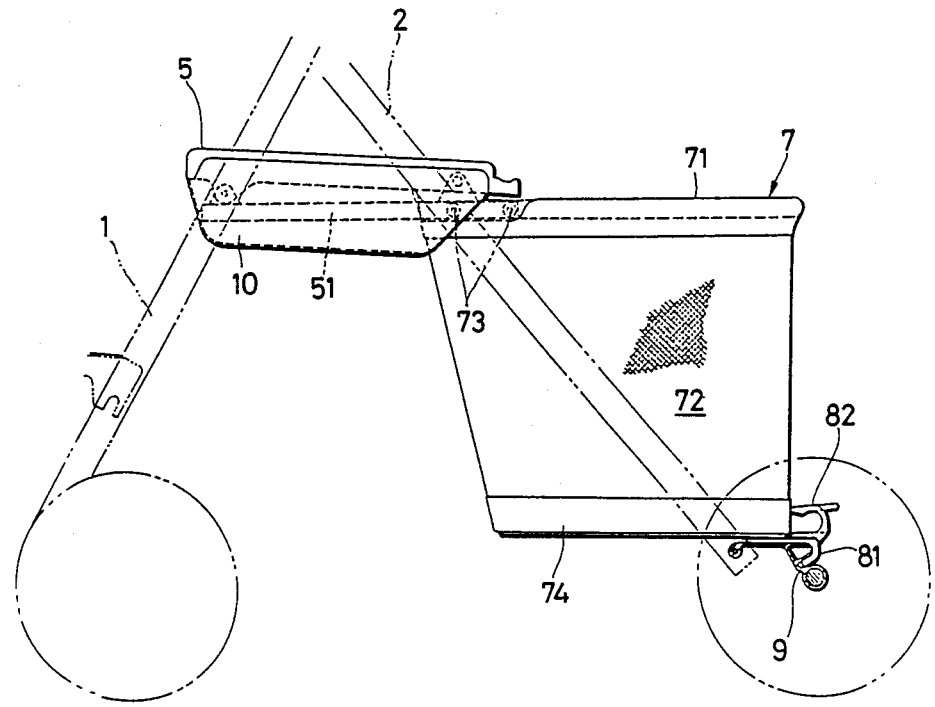
FIG. 4 is a side elevational view showing the condition of engagement between the article receiving body and a step.

(2) As typically embodied by the embodiment illustrated in FIG. 1, while the article receiving body 7 is adapted to provide an opening area sufficient for receiving articles purchased during use of the body 7, the body 7 is also adapted to be movable to a position below the lower surface of the seat board 5 so as to be stowed at this position when necessary after articles have been received. If the received article(s) fill the article receiving body 7 to the upper end thereof, the seat board 5 can be used to provide the function of a lid board after the body 7 has been moved to below the lower surface of the seat board 5. This is an effect which cannot be expected from a conventional shopping basket.

(3) The arrangement of a shopping basket provided in a conventional baby carriage is such that the basket is brought into its usable condition automatically by setting up the baby carriage proper. In contrast with this, the article receiving body 7 of the present device can be folded and stowed below the lower surface of the seat board 5 when it is not in use. Therefore, the baby carriage can be used with its overall structure being kept in a compact condition even when the article receiving body is not in use.

(4) The folding the article receiving body 6 is performed by simply moving the article receiving body 7, or, when necessary, by simply adding the operation of contracting the body 7 through moving the bottom board 74 toward the frame member 71. Thus, the folding can be effected by very easy operations.

We claim:

1. A baby carriage usable as a shopping carrier, comprising: a seat in which an infant may be seated; guide rails disposed on opposing sides of an underside of said seat; a foldable article receiving body having an opening at an upper end thereof and being slidably mounted on said guide rails of said seat, said article receiving body being movable from a folded position below the underside of said seat to an unfolded position at the rear of the underside of said seat and being supported at each of said positions.

2. A baby carriage according to claim 1, wherein said article receiving body comprises a frame member having a U-shaped planar configuration, and a bag portion having a bottom board and being hung from said frame member.

3. A baby carriage according to claim 1, wherein said article receiving body is slidable in the front and rear directions on said guide rails of said seat portion.

4. A baby carriage according to claim 1, wherein said article receiving body can be folded alone when necessary.

5. A baby carriage according to claim 1, wherein said article receiving body comprises a frame member having a U-shaped planar configuration and a bag portion on which is mounted a bottom board on a reverse surface of which a shape-maintaining plate is integrated. Said shape-maintaining plate having a front end portion supported by a hanging member that is hung from a front end portion of said frame member in such a manner as to pass a position either on or inward of the front surface of said bag portion.

6. A baby carriage according to claim 5, wherein said hanging member can be inserted into and received in on inside of said shape-maintaining plate in the longitudinal direction during folding of said article receiving body.

7. A baby carriage according to claim 1, wherein said article receiving body is foldable while it is being moved to a position below the underside of said seat portion.

8. A baby carriage according to claim 1, wherein a rear portion of an underside of said article receiving body is adapted to be detachably engaged with a step plate via a stopper.

* * * * *